United States Patent
Nemeth

(10) Patent No.: US 9,505,939 B2
(45) Date of Patent: Nov. 29, 2016

(54) WET SANDING COMPOSITIONS

(71) Applicant: Richard Eric Nemeth, Silverdale, WA (US)

(72) Inventor: Richard Eric Nemeth, Silverdale, WA (US)

( * ) Notice: Subject to any disclaimer, the term of this patent is extended or adjusted under 35 U.S.C. 154(b) by 25 days.

(21) Appl. No.: 14/515,204

(22) Filed: Oct. 15, 2014

(65) Prior Publication Data

US 2015/0038597 A1    Feb. 5, 2015

Related U.S. Application Data

(63) Continuation of application No. 13/406,350, filed on Feb. 27, 2012, now Pat. No. 8,888,559.

(60) Provisional application No. 61/447,468, filed on Feb. 28, 2011.

(51) Int. Cl.
*B24B 19/20* (2006.01)
*C09D 9/04* (2006.01)
*B24B 19/24* (2006.01)
*C09G 1/04* (2006.01)

(52) U.S. Cl.
CPC ............ *C09D 9/04* (2013.01); *B24B 19/24* (2013.01); *C09G 1/04* (2013.01)

(58) Field of Classification Search
CPC ................... B24B 19/24; C09G 1/04
USPC .......................................... 451/54
See application file for complete search history.

(56) References Cited

U.S. PATENT DOCUMENTS

| | | |
|---|---|---|
| 3,189,553 A | 6/1965 | Lange |
| 3,415,755 A | 12/1968 | Luck |
| 4,285,827 A | 8/1981 | Wyatt |
| 4,749,510 A | 6/1988 | Nelson |
| 4,851,154 A | 7/1989 | Grollier |
| 5,612,024 A | 3/1997 | Giede |
| 5,690,539 A | 11/1997 | Swidler |
| 6,117,831 A | 9/2000 | Chiang |
| 6,174,847 B1 | 1/2001 | Lallier |
| 6,444,134 B1 | 9/2002 | Holman |
| 6,774,096 B1 | 8/2004 | Paye |
| 6,821,937 B2 | 11/2004 | Gross |
| 7,056,445 B2 | 6/2006 | Kimura |
| 7,211,551 B2 | 5/2007 | McDonald |
| 8,888,559 B2 * | 11/2014 | Nemeth ................ B24B 19/24 451/54 |
| 2002/0035049 A1 | 3/2002 | Suri |
| 2003/0045440 A1 | 3/2003 | Van Der Hoeven |
| 2004/0058833 A1 | 3/2004 | Gross |
| 2005/0239379 A1 | 10/2005 | Ritchie |
| 2006/0120986 A1 | 6/2006 | Albrecht |
| 2006/0211339 A1 | 9/2006 | Woods |
| 2009/0130038 A1 | 5/2009 | Biganska |
| 2010/0184633 A1 | 7/2010 | Bernhardt |
| 2011/0262504 A1 | 10/2011 | Deleersnyder |
| 2012/0220199 A1 | 8/2012 | Nemeth |

FOREIGN PATENT DOCUMENTS

EP     1 978 080 A1    10/2008

OTHER PUBLICATIONS

International Search Report mailed Nov. 30, 2012, issued in corresponding Application No. PCT/US2012/026800, filed Feb. 27, 2012, 5 pages.

* cited by examiner

*Primary Examiner* — George Nguyen
(74) *Attorney, Agent, or Firm* — Christensen O'Connor Johnson Kindness PLLC

(57) ABSTRACT

A wet sanding adjuvant is comprised of a composition comprising: (1) an alkali metal or ammonium salt of an alkoxylated alkyl sulfate; (2) an alkali metal or ammonium salt of an alphaolefin sulfonate; (3) a cellulose derivative selected from the group consisting of hydroxyalkyl cellulose, a carboxyalkyl cellulose and combinations thereof. The adjuvant is used in a method of removing a coating from a surface comprising the steps of: (1) contacting a coated surface with a composition according to the invention to form a wet surface on the coating; (2) abrading the wet surface with an abrasive; (3) removing the composition from the surface.

20 Claims, No Drawings

WET SANDING COMPOSITIONS

CROSS-REFERENCES TO RELATED APPLICATIONS

This application is a continuation of U.S. application Ser. No. 13/406,350, filed Feb. 27, 2012, which claims the benefit of U.S. Provisional Application No. 61/447,468, filed Feb. 28, 2011. The disclosures of each of the above-referenced applications are expressly incorporated herein by reference in their entirety.

FIELD OF THE INVENTION

The present invention pertains to wet sanding adjuvant compositions and methods for removing coatings from coated surfaces using the inventive adjuvant compositions.

BACKGROUND OF THE INVENTION

The present invention pertains to an adjuvant for wet sanding of a surface. Surfaces such as wood are routinely sanded with an abrasive such as sandpaper to remove paint and/or other surface coatings, and to smooth the surface for fresh surface coating applications such as repainting or re-varnishing. These surfaces are sometimes wet sanded because this method reduces the amount of dust which can be an environmental and/or health hazard. However, wetting unfinished wood that results during sanding raises the wood grain and makes it rough or fuzzy, leading to extra sanding.

SUMMARY OF THE INVENTION

Compositions according to the invention are comprised of (1) an alkali metal or ammonium salt of an alkoxylated alkyl sulfate; (2) an alkali metal or ammonium salt of an alphaolefin sulfonate; (3) a cellulose derivative selected from the group consisting of hydroxyalklyl cellulose, a carboxyalkyl cellulose and combinations thereof.

The present invention also includes a method of removing a coating from a surface comprising the steps of (1) contacting a coated surface with a composition according to the invention to form a wet surface on the coating; (2) abrading the wet surface with an abrasive; (3) removing the composition from the surface. The coating surface can be contacted by any means that will effectively wet the surface, such as by spraying or brushing. The abrading step can be accomplished by hand sanding or machine sanding such as by the use of an orbital or reciprocating power sander. The present invention is especially useful for safely removing lead-based paint from painted wood surfaces. Before the 1970s, household paint often contained lead. As lead paint ages, it can chip, flake and/or crumble into dust. Exposure to lead-paint dust or chips can cause serious health problems. Exposure to lead-paint dust or chips poses a higher risk to children and pregnant women. The preferred method for removing flaking paint is the wet sanding of surfaces, which is gentle to the surfaces and generates little dust. Wet hand sanding, and/or power sanding equipped with a HEPA-filtered vacuum attachment, are acceptable methods of removing lead paint. Dry hand sanding is usually avoided because of the obvious health risks presented by lead dust.

The present invention is also effective in removing lead-based paint that has been painted over with a water-based latex paint. Both layers of paint can be safely and effectively removed by the method according to the invention without a corresponding damage to the wood itself caused by mechanically abrading the surface, such as by the use of a an orbital or reciprocating power sander.

DETAILED DESCRIPTION OF THE INVENTION

Compositions according to the invention are comprised of (1) an alkali metal or ammonium salt of an alkoxylated alkyl sulfate; (2) an alkali metal or ammonium salt of an hydroxyalklyl cellulose, a carboxyalkyl cellulose and combinations thereof.

Alkali metal or ammonium salt of alkoxylated alkyl sulfates according to the invention are well known and are especially useful as anionic surfactants. Examples of these compounds, otherwise known as alkali metal ether sulfate salts include, but are not limited to, sodium lauryl ether sulfate, also known as sodium laureth sulfate, ammonium laureth sulfate and the like. The amount of an alkali metal or ammonium salt of an alkoxylated alkyl sulfate in the composition according to the invention can range from about 0.01% to about 2.0% by weight, with the preferred range being from about .01% to about 1.0%.

Alkali metal or ammonium salt of an alphaolefin sulfonates according to the invention are well known and are especially useful as anionic surfactants. Examples of these compounds, otherwise known as alkali ether sulfate salts, include, but are not limited to, sodium $C_{14-16}$ olefin ether sulfate, ammonium $C_{14-16}$ olefin ether sulfate, sodium $C_{12-16}$ olefin ether sulfate and the like. The amount of an alkali metal or ammonium salt of an alphaolefin sulfonate in the composition according to the invention can range from about 0.01% to about 2.0% by weight, with the preferred range being from about 0.01% to about 1.0%.

The cellulose derivatives according to the invention comprise hydroxyalkyl celluloses and carboxyalkyl celluloses. The hydroxyalkyl celluloses, also known as hydroxyalkyl cellulose ethers, according to the invention are well known and are used for a variety of applications, which include detergents, surface coatings, building products, and oil field applications. Examples of hydroxyalkyl cellulose ethers include, but are not limited to, hydroxyethyl cellulose, hydroxypropyl cellulose, and the like. Important properties of cellulose ethers are determined by the molecular weight of the cellulose used, the chemical structure and distribution of the hydroxyalkyl groups and the degree of substitution. These properties generally include solubility, viscosity in solution, surface activity, thermoplastic film characteristics, and stability against biodegradation, heat, hydrolysis, and oxidation. Viscosity in solution varies directly with molecular weight. The preferred hydroxyalkyl ether cellulose is hydroxyethyl cellulose having a viscosity of from about 1,500 to about 2,500 cps. (Brookfield viscosity of a 1% aq. solution @ 25° C.).

The amount of the cellulose derivative in the composition according to the invention can range from about 0.01% to about 2.0% by weight, with the preferred range being from about 0.1% to about 1.0%. The carboxyalkyl celluloses include, but are not limited to, carboxymethyl cellulose and carboxyalkoxy celluloses, such as carboxymethoxy cellulose. These compounds are well known for viscosity modification in foods, water-based paints, textile sizing, detergents, and many other applications. Combinations of two or more cellulose derivatives can also be used.

The compositions according to the invention can also contain additives such as preservatives and fragrances. The compositions according to the invention can be made by adding each component to water having an alkaline pH at room temperature with efficient mixing.

The present invention also includes a method of removing a coating from a surface comprising the steps of (1) contacting a coated surface with a composition according to the invention to form a wet surface on the coating; (2) abrading the wet surface with an abrasive; (3) removing the composition from the surface. The coating surface can be contacted by any means that will effectively wet the surface, such as by spraying or brushing. The abrading step can be accomplished by hand sanding or machine sanding, such as by the use of an orbital or reciprocating power sander. After the abrasion step, the composition according to the invention will typically be a slurry of abrasive coating particles, substrate particles such as wood, and water. The slurry can be removed by a number of methods such as by rinsing with water, wiping, brushing or a combination thereof.

The following examples show the effectiveness of an embodiment of a composition according to the invention and its use as a wet sanding adjuvant. The composition denoted as Composition A is a composition according to the invention which was comprised of the following components:

0.5% by weight of NATRASOL® HR 250 (hydroxyethyl cellulose), a trademark product of Aqualon Company; 0.025% sodium laureth sulfate; 0.025% sodium $C_{14-16}$ olefin ether sulfonate; and water qs. The composition denoted as Composition B is the composition disclosed in published U.S. Patent Application No. 20050239379 and was comprised of the following components:

0.61% sodium $C_{14-16}$ olefin ether sulfate; 0.61% sodium laureth sulfate; 0.0001% fragrance; 98.78% water.

EXAMPLE 1

Weather-beaten beveled cedar siding boards having a deteriorated semi-transparent stain were used in this test. The boards were located on the side of a house, where the face of the boards stood vertically and the length of the boards ran horizontally. Signs of the aging wood included pitting and loose wood fiber along with a horizontal grain line pattern. The cedar wood was dry to the touch, typical of a state that is in need of new stain.

About 60 ml of Composition A was applied to a six-inch by six-foot board from a spray bottle having volumetric markings, brushed into the wood and allowed to soak in for 5 minutes. An additional 30 ml of Composition A was then applied to keep the surface wet while sanding with Virginia Abrasive 12 grit sandpaper on a random orbital sander Dewalt DW26451 rated at 12,000 max rpm for two minutes. The slurry remained mostly on the board and within the grit of the sandpaper. The existing slurry on the wood was removed by a stiff, short bristle mason's brush. An additional 10 ml of Composition A was applied to areas that needed further sanding. Those areas were brushed clean and rechecked and determined to be acceptable. Then the entire board was rinsed off with water. The finished sample, which had the soft dead wood removed, showed no signs of sander-swirling gouges in the board. The achieved finish was a smooth board which appeared as though it had been finished by a wood planer. One week later there was no noticeable raised splintering of the grain.

EXAMPLE 2

The procedure of Example 1 above was repeated using 30 ft² of cedar siding boards (10 boards 6' long). Because the abrasion operation removed a considerable amount of material, a small amount of Composition A was applied while the sander was in motion to the sandpaper that contained some trapped sanding slurry. The slurry was released immediately to the ground below without being flung any distance further than one foot.

EXAMPLE 3

This example illustrates the effect of water being applied during the abrading step. The procedure of Example 1 above was repeated on one board, except with a slight modification. Initial application and sanding were the same, but instead of brushing off the slurry to check for other areas that might need additional sanding, the slurry was rinsed off the board with water. Another 10 ml of Composition A was applied to the areas that needed additional sanding. Those areas were sanded with 12 grit sandpaper and the slurry was brushed from the board. Swirl marks from the sander were noticed. A final water rinse was applied and the boards were allowed to dry for one week. Composition A was applied to the swirl mark areas and the sanding was continued with 20 grit sandpaper. This resulted in a smooth finish where the swirl marks had been.

COMPARATIVE EXAMPLE 1

The procedure of Example 1 above was repeated, except that (i) the adjuvant used was Composition B and (ii) 90 ml was required because the board quickly absorbed Composition B. Upon sanding, small wet splinters of wood were flung three feet from the point of contact of the sander. After the completion of the sanding, the board that was scored with swirl marks from the random sander and splinters of wood protruded from the cedar board. One week later there was more noticeable splintering and "fuzzing" of the wood surface.

COMPARATIVE EXAMPLE 2

The procedure of Example 1 above was repeated, except that pure water was used instead of either Composition A or B. The results were similar to those obtained with Composition B.

COMPARATIVE EXAMPLE 3

The procedure of Example 1 above was repeated, except that no liquid adjuvant was used. After abrasion, deep swirl marks in the wood and airborne dust and splinters were observed.

EXAMPLE 4

The procedure of Example 1 above was repeated, except that the wood used was a two-foot by one-foot piece of mahogany coated with old varnish and was laid out flat horizontally. About 15 ml of Composition A was sprayed onto the wood surface and then brushed evenly. The abrasion was carried out with an Orbital Sander Dewalt 26451 at a maximum rated 12,000 rpm using Norton Abrasive Silicone Carbide 20 grit sandpaper. During the sanding, as the wood was being exposed, another 15 ml of Composition A was applied in order to keep the wood wet. All the varnish was removed in 30 seconds, exposing the wood. The slurry was brushed off with a short bristle mason's brush. The wood surface showed no swirl cut marks. However, there were random areas that exhibited a slight carpet of fuzz and small splintering on the mahogany. Another 15 ml of solution was applied to the wood and followed by an additional 30 seconds of sanding with Norton Abrasive 120 grit sandpaper. The result was a piece of wood having a smooth finish. One week later there were no visible signs of raised grain splintering.

COMPARATIVE EXAMPLE 4

The procedure of Example 1 above was repeated, except that the mahogany had a varathane finish, the sanding adjuvant used was Composition B, and no brushing of the adjuvant was necessary. Another 15 ml of Composition B was applied to the wood in order to keep the wood wet while sanding. During the sanding, very little of the slurry remained within the sandpaper or on the wood and the wet slurry was projected as far as four feet away from the point of sanding. Even after wetting the wood, the sanding left swirl cut marks in the mahogany. An attempt to sand out the swirl marks using Composition Band 120 grit sandpaper removed a large portion of the swirl marks but left a considerable amount of fuzz that could not be sanded out while the wood was wet.

After drying for one week, the swirl marks were removed by sanding with 120 grit sandpaper and 15 ml of the Composition A.

COMPARATIVE EXAMPLE 5

The procedure of Example 1 above was repeated, except that no liquid adjuvant was used. The sanding was carried out for 10 seconds only because it was cutting unevenly past the varathane and was leaving swirl marks in the wood. Sanding with 36 grit sandpaper was then carried out for three minutes to remove all the varathane and most of the swirl marks left from the 20 grit. However, the 36 grit left smaller, less frequent swirl marks of its own. Further sanding using 120 grit paper was carried out for 60 seconds. This removed all the swirl marks but left fuzz on the mahogany that was removed by using 220 grit for 60 seconds.

EXAMPLE 4

The procedure of Example 1 above was repeated, except that the coated surface was a vertical cement wall having an epoxy coating. About 5 ml of Composition A was sprayed onto the surface and the sanding was carried out using Norton Abrasive 120 grit sandpaper on a random orbital Dewalt 26451 at max 12,000 rpm for 30 seconds to make the surface smooth.

COMPARATIVE EXAMPLE 6

The procedure of Example 1 above was repeated, except that the adjuvant was Composition B and the wall was wiped again with 5 ml of the adjuvant in order to smooth out the roller stipple in the epoxy coating.

EXAMPLE 5

This example shows the use of the composition according to the invention as an adjuvant in hand sanding to remove brush lines in latex painted surface. About 5 ml of Composition A was applied to a medium density fiber board (MDF) painted Valspar latex semi-gloss enamel and hand-sanded with a quarter sheet of 3M Tri-M-Ite 220 grit sandpaper. The sanding was carried out in the 6.5' by 4" brush lines that were in the paint surface in order to remove or minimize them for further painting. After the first sanding, the MDF board was repainted with Valspar latex semi-gloss, resulting in a notable reduction in the height of any brush marks on the second coat.

COMPARATIVE EXAMPLE 7

The procedure of Example 5 above was repeated, except that the adjuvant used was Composition B. The height of the brush marks after repainting was the same as the original brush marks.

The invention claimed is:

1. A composition, comprising:
   (1) from 0.01% to 2.0% by weight of an alkali metal salt of an alkoxylated alkyl sulfate or an ammonium salt of an alkoxylated alkyl sulfate;
   (2) from 0.01% to 2.0% by weight of an alkali metal salt of an alphaolefin sulfonate or an ammonium salt of an alphaolefin sulfonate; and
   (3) from 0.01% to 2.0% by weight of a cellulose derivative selected from the group consisting of hydroxyalkyl cellulose, a carboxyalkyl cellulose, and combinations thereof.

2. The composition of claim 1, wherein the alkali metal salt of an alkoxylated alkyl sulfonate is sodium lauryl ether sulfate.

3. The composition of claim 1, wherein the alkali metal salt of an alphaolefin sulfonate is a sodium salt of an alphaolefin sulfonate.

4. The composition of claim 1, wherein the alkali metal salt of an alphaolefin sulfonate or ammonium salt of an alphaolefin sulfonate comprises a $C_{14-6}$ olefin ether sulfate.

5. The composition of claim 1, wherein the cellulose derivative is selected from the group consisting of hydroxypropyl cellulose and hydroxyethyl cellulose.

6. The composition of claim 1, wherein the cellulose derivative is carboxymethyl cellulose.

7. A method of coating a surface, comprising contacting a surface to form a wet surface on the surface with a composition, comprising:
   (a) from 0.01% to 2.0% of an alkali metal salt of an alkoxylated alkyl sulfate or an ammonium salt of an alkoxylated alkyl sulfate,
   (b) from 0.01% to 2.0% by weight of an alkali metal salt of an alphaolefin sulfonate or an ammonium salt of an alphaolefin sulfonate, and
   (c) from 0.01% to 2.0% weight of a cellulose derivative selected from the group consisting of hydroxyalkyl cellulose, a carboxyalkyl cellulose, and combinations thereof.

8. The method of claim 7, wherein the alkali metal salt of an alkoxylated alkyl sulfonate is sodium lauryl ether sulfate.

9. The method of claim 7, wherein the alkali metal salt of an alphaolefin sulfonate is a sodium salt of an alphaolefin sulfonate.

10. The method of claim 7, wherein the alkali metal salt of an alphaolefin sulfonate or ammonium salt of an alphaolefin sulfonate comprises a $C_{14-6}$ olefin ether sulfate.

11. The method of claim 7, wherein the cellulose derivative is selected from the group consisting of hydroxypropyl cellulose and hydroxyethyl cellulose.

12. The method of claim 7, wherein the cellulose derivative is carboxymethyl cellulose.

13. The method of claim 7, further comprising a step of abrading the wet surface with an abrasive to provide an abraded wet surface.

14. The method of claim 13, further comprising a step of removing the composition from the abraded wet surface.

15. The method of claim 7, further comprising a step of removing the composition from the surface.

16. A composition comprising:
  (1) from 0.01% to 2.0% by weight of an alkali metal salt of an alkoxylated alkyl sulfate;
  (2) from 0.01% to 2.0% by weight of an alkali metal salt of an alphaolefin sulfonate; and
  (3) from 0.01% to 2.0% by weight of hydroxyalkyl cellulose.

17. The composition of claim 16, wherein the alkali metal salt of an alkoxylated alkyl sulfonate is sodium lauryl ether sulfate.

18. The composition of claim 16, wherein the alkali metal salt of an alphaolefin sulfonate is a sodium salt of an alphaolefin sulfonate.

19. The composition of claim 1, wherein the hydroxyalkyl cellulose is selected from the group consisting of hydroxypropyl cellulose and hydroxyethyl cellulose.

20. The composition of claim 1, wherein the alkali metal salt of an alphaolefin sulfonate comprises a $C_{14-6}$ olefin ether sulfate.

\* \* \* \* \*